(12) United States Patent
Matsuyama

(10) Patent No.: US 9,529,175 B2
(45) Date of Patent: Dec. 27, 2016

(54) PROJECTION OPTICAL APPARATUS AND IMAGE PROJECTION APPARATUS

(71) Applicant: Toshinobu Matsuyama, Kanagawa (JP)

(72) Inventor: Toshinobu Matsuyama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/837,379

(22) Filed: Aug. 27, 2015

(65) Prior Publication Data

US 2016/0062075 A1 Mar. 3, 2016

(30) Foreign Application Priority Data

Sep. 1, 2014 (JP) .................................. 2014-177453

(51) Int. Cl.
*G03B 21/16* (2006.01)
*G02B 7/02* (2006.01)
*G03B 21/00* (2006.01)

(52) U.S. Cl.
CPC .............. *G02B 7/028* (2013.01); *G03B 21/16* (2013.01); *G03B 21/008* (2013.01)

(58) Field of Classification Search
CPC .......... G03B 21/16; G02B 7/008; G02B 7/028
USPC ........ 353/100, 101, 52, 57, 60, 61; 359/395, 359/811, 820
See application file for complete search history.

(56) References Cited

U.S. PATENT DOCUMENTS

| | | | | |
|---|---|---|---|---|
| 3,420,607 A | * | 1/1969 | Zillmer | G03B 21/001 353/100 |
| 7,517,088 B1 | * | 4/2009 | Kretzschmar | F21V 9/08 353/100 |
| 2006/0072218 A1 | * | 4/2006 | Kageyama | G02B 7/021 359/819 |
| 2010/0097579 A1 | * | 4/2010 | Hsieh | G03B 21/16 353/52 |

FOREIGN PATENT DOCUMENTS

| | | |
|---|---|---|
| JP | 2004-029356 | 1/2004 |
| JP | 2008-051919 | 3/2008 |
| JP | 2011-090058 | 5/2011 |

* cited by examiner

*Primary Examiner* — William C Dowling
(74) *Attorney, Agent, or Firm* — Oblon, McClelland, Maier & Neustadt, L.L.P.

(57) ABSTRACT

A disclosed projection optical apparatus includes a plurality of lenses, each of the lenses having a flat surface in a part of an outer circumference; a lens holder having a hollow cylindrical shape and configured to hold the lenses; and a vent hole formed of gaps communicating between the flat surfaces of the lenses and the lens holder.

10 Claims, 11 Drawing Sheets

PROJECTION OPTICAL APPARATUS AND IMAGE PROJECTION APPARATUS

BACKGROUND OF THE INVENTION

1. Field of the Invention

The disclosures herein generally relate to a projection optical apparatus and an image projection apparatus.

2. Description of the Related Art

There have been widely used projectors configured to project image data transmitted from PCs or video cameras onto screens or the like. In such projectors, various types of malfunctions may be observed due to heat generated by light sources or heat transferred by the light sources onto parts of the projectors, which may degrade the quality of the displayed images.

To control such malfunctions, there are proposed thermal countermeasure structures for the projectors (e.g., Japanese Laid-open Patent Publication No. 2008-51919 hereinafter referred to as "Patent Document 1"). The thermal countermeasure structures partition the inside of a projector between a heat generating section that contains a light source and a heat control section that contains a circuit board and the like. In the thermal countermeasure structure, heat transferred from the heat generating section is cut off by a mediator to control the temperature of the circuit board and the like from rising in the heat control section.

However, in such a thermal countermeasure structure, an optical system such as lenses disposed together with the light source in the heat generating section may still be susceptible to the temperature rise by receiving heat from a light source or infrared components of the light emitted from the light source. For example, when lenses or lens holders holding the lenses are heated to raise the temperatures to thermally expand, projection directions or focal positions may fluctuate due to the displacement of the lens positions and the like, which may degrade the quality of the display images.

RELATED ART DOCUMENT

Patent Document

Patent Document 1
Japanese Laid-open Patent Publication No. 2008-51919

SUMMARY OF THE INVENTION

Accordingly, it is a general object in one embodiment of the present invention to provide a projection optical apparatus capable of controlling the temperature rise of an optical system that substantially obviates one or more problems caused by the limitations and disadvantages of the related art.

According to an aspect of embodiments, there is provided a projection optical apparatus that includes a plurality of lenses, each of the lenses having a flat surface in a part of an outer circumference; a lens holder having a hollow cylindrical shape and configured to hold the lenses; and a vent hole formed of gaps communicating between the flat surfaces of the lenses and the lens holder.

Other objects, features and advantages of the present invention will become more apparent from the following detailed description when read in conjunction with the accompanying drawings.

DETAILED DESCRIPTION OF THE PREFERRED EMBODIMENTS

Figure 1:
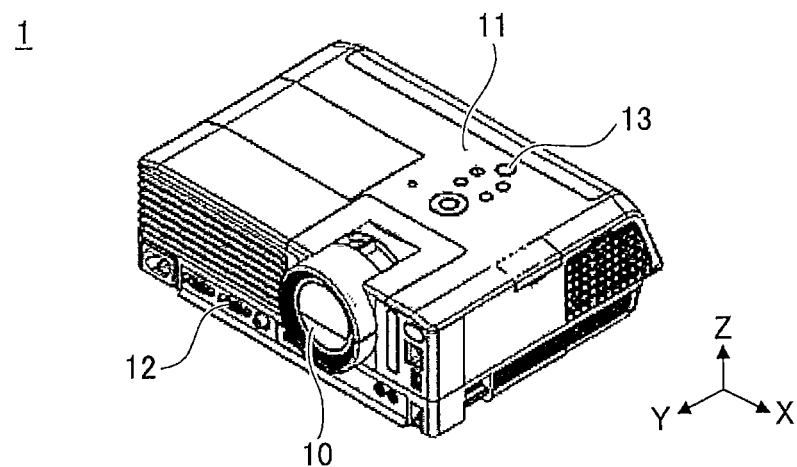
FIG. 1 is a perspective view illustrating an example of an image projection apparatus in a first embodiment.

In the following, a description is given of an embodiment of the present invention with reference to accompanying drawings. In the drawings, identical components are provided with the same reference numbers to omit duplicated illustrations.

First Embodiment

Configuration of Image Projection Apparatus

Figure 2:
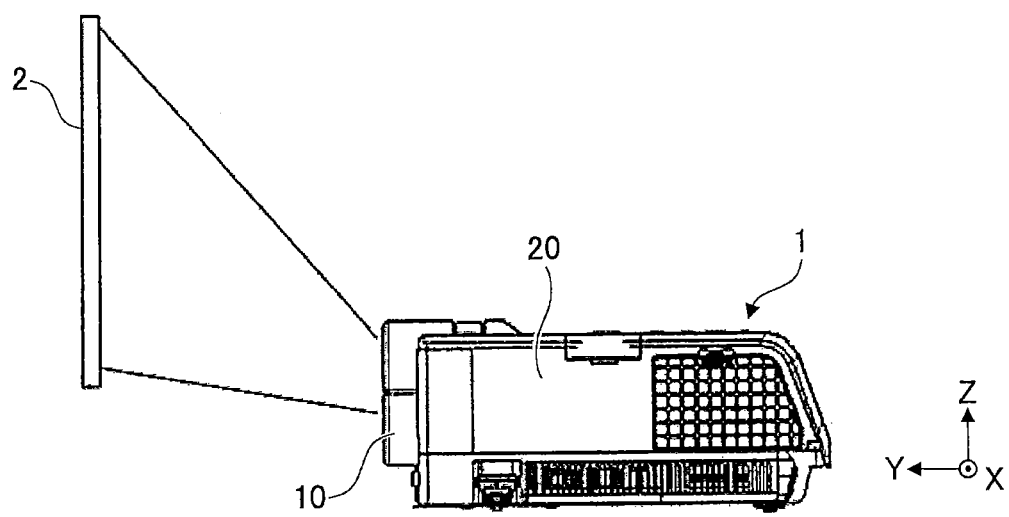
FIG. 2 is a side view illustrating an example of the image projection apparatus in the first embodiment.
Figure 3:
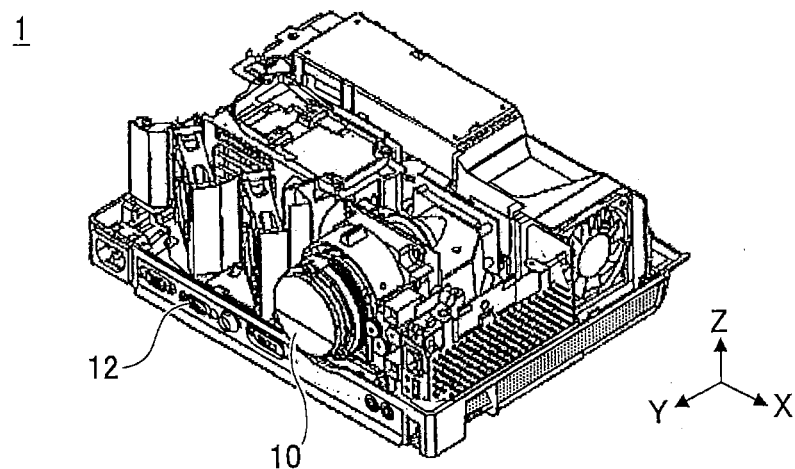
FIG. 3 is a perspective view illustrating an example of the image projection apparatus in the first embodiment from which an exterior cover is removed.

Initially, a description is given, with reference to FIGS. 1 to 3, of a configuration of an image projection apparatus 1 in a first embodiment.

FIG. 1 is a perspective view illustrating an example of the image projection apparatus 1 in the first embodiment, and FIG. 2 is a side view illustrating an example of the image projection apparatus 1. In addition, FIG. 3 is a perspective view illustrating an example of the image projection apparatus 1 in the first embodiment from which an exterior cover 11 is removed. Note that in FIGS. 1 to 3, an X direction indicates a width direction, a Y direction indicates a depth direction, and a Z direction indicates a height direction of the image projection apparatus 1.

As illustrated in FIGS. 1 and 2, the image projection apparatus 1 includes a projection optical apparatus 10 configured to project an image on a screen 2, an exterior cover 11 covering the projection optical apparatus 10, an external terminal 12 connected to an external apparatus, and an operations part 13 configured to receive various types of operations.

Examples of the external terminal 12 include an RGB terminal, a video terminal, an audio terminal, and the like that are used for connecting the image projection apparatus 1 to external apparatuses. The operations part 13 may be formed of hardware keys such as a power button, a menu display button, and a determination button.

The projection optical apparatus 10 is disposed within a part of the image projection part 1 enclosed by a solid line as illustrated in FIG. 3. The projection optical apparatus 10 is configured to project a display image on the image on the screen 2 or the like as illustrated in FIG. 2, the display image being generated based on image data input into projection apparatus 1.

The image projection apparatus 1 includes the above-described configuration, and is configured to generate the display image based on the image data input from a PC or a video camera connected to the external terminal so as to allow the projection optical apparatus 10 to project the generated projection image on the screen 2 or the like.

Configuration of Projection Optical Apparatus

Figure 4:
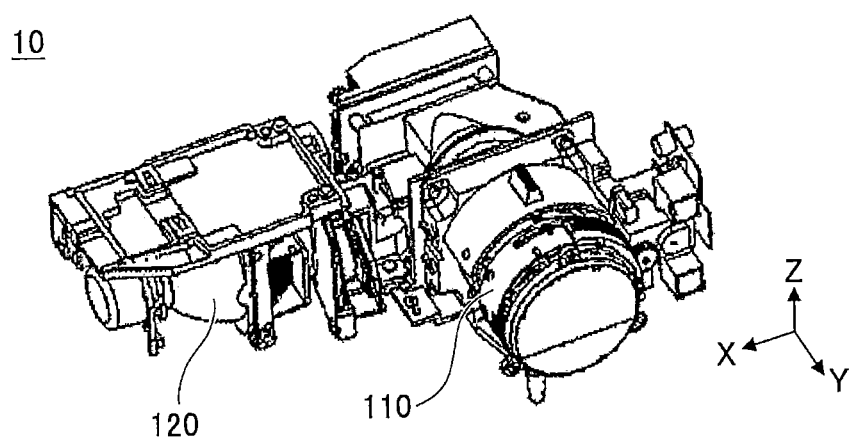
FIG. 4 is a perspective view illustrating an example of a projection optical apparatus in the first embodiment.
Figure 5:
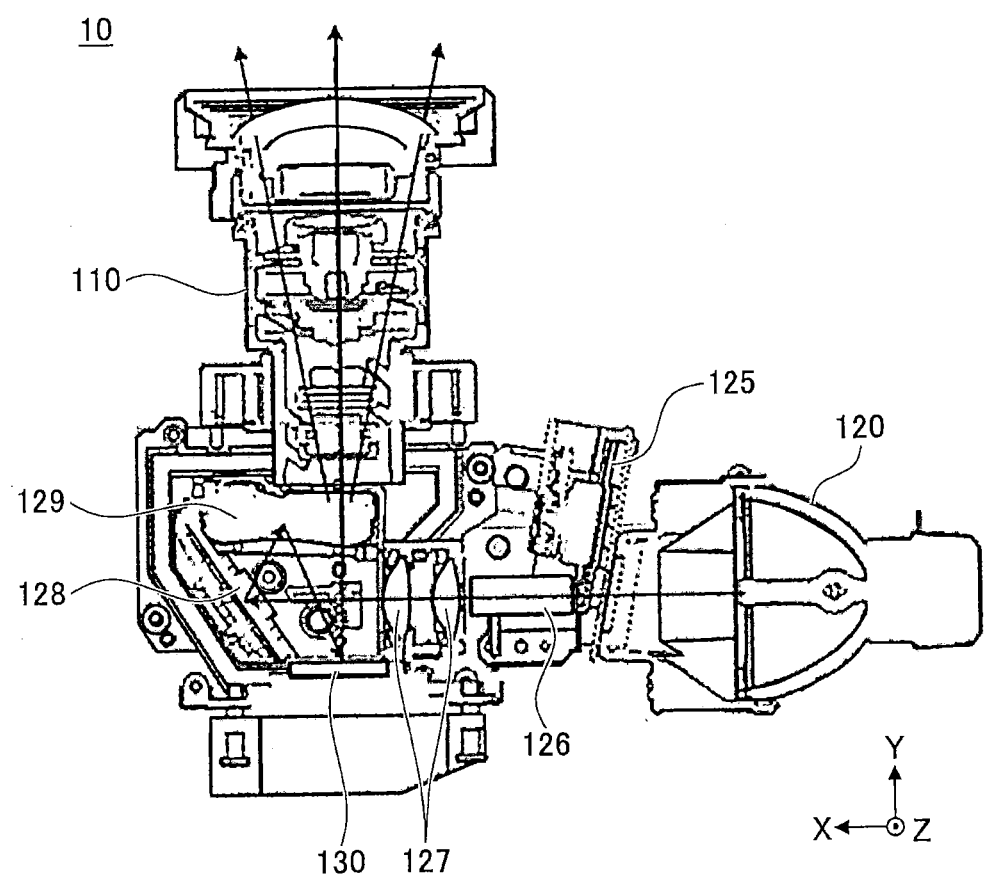
FIG. 5 is a cross-sectional view illustrating an example of the projection optical apparatus in the first embodiment.

Next, a description is given, with reference to FIGS. 4 to 5, of a configuration of the projection optical apparatus 10 in the first embodiment. FIG. 4 is a perspective view illustrating an example of the projection optical apparatus 10 in the first embodiment, and FIG. 5 is an X-Y cross-sectional view illustrating an example of the projection optical apparatus 10.

As illustrated in FIG. 4, the projection optical apparatus 10 includes a projection optical system 110 and a light source 120. Further, the projection optical apparatus 10 includes a color wheel 125, a light tunnel 126, a relay lens 127, a planer mirror 128, a concave mirror 129, and a digital mirror device (herein after called "DMD") 130.

The color wheel 125 may, for example, be a disk having filters of different colors of R (red), G (green), and B (blue) that are disposed on different parts in a circumferential direction of the color wheel 125. The color wheel 125 is configured to rotate at a high speed to time-separate light from the light source 120 into respective RGB colors.

The light tunnel 126 may, for example, be formed by bonding sheets of glass to have a rectangular cylindrical shape. The light tunnel 126 is configured to lead respective RGB colors of light transmitted through the color wheel 125 to the relay lens 127.

The relay lens 127 is composed of two lenses configured to correct chromatic aberration in an axis of light emitted from the light tunnel 26 while converging light.

The planer mirror 128 and the concave mirror 129 are configured to reflect light emitted from the relay lens 127 to converge the reflected light onto an image generation surface of the DMD 130.

The DMD 130 includes the image generation surface having movable micro-mirrors disposed in a lattice. Each of the micro-mirrors of the DMD 130 is tiltably disposed around a twisted axis, and is configured to be on/off driven based on a projected display image. Angles (inclined angles) of the micro-mirrors of the DMD 130 may be controlled in directions of light from the light source 120 reflected in the projection optical system 110 when the DMD is turned ON, for example. Further, the angles of the micro-mirrors of the DMD 130 may be controlled in directions of light from the light source 120 reflected toward a not-illustrated OFF-optical plate when the DMD is turned OFF, for example.

As described above, the angles of the micro-mirrors of the DMD 130 are controlled based on the projected display image to modulate the light emitted from the light source 120, thereby generating pixels of the display image.

The projection optical system 110 includes multiple lenses configured to enlarge reflected light of the display image generated by the DMD 130 and project the enlarged display image onto the screen 2 or the like. A configuration of the projection optical system 110 will be described later.

The projection optical apparatus 10 has the above-described configuration to generate the display image from light emitted from the light source 120, and project the enlarged display image from the projection optical system 110 onto the screen 2 or the like.

Projection Optical System

Next, an illustration is given of a configuration of the projection optical system 110 in the first embodiment.

Figure 6:
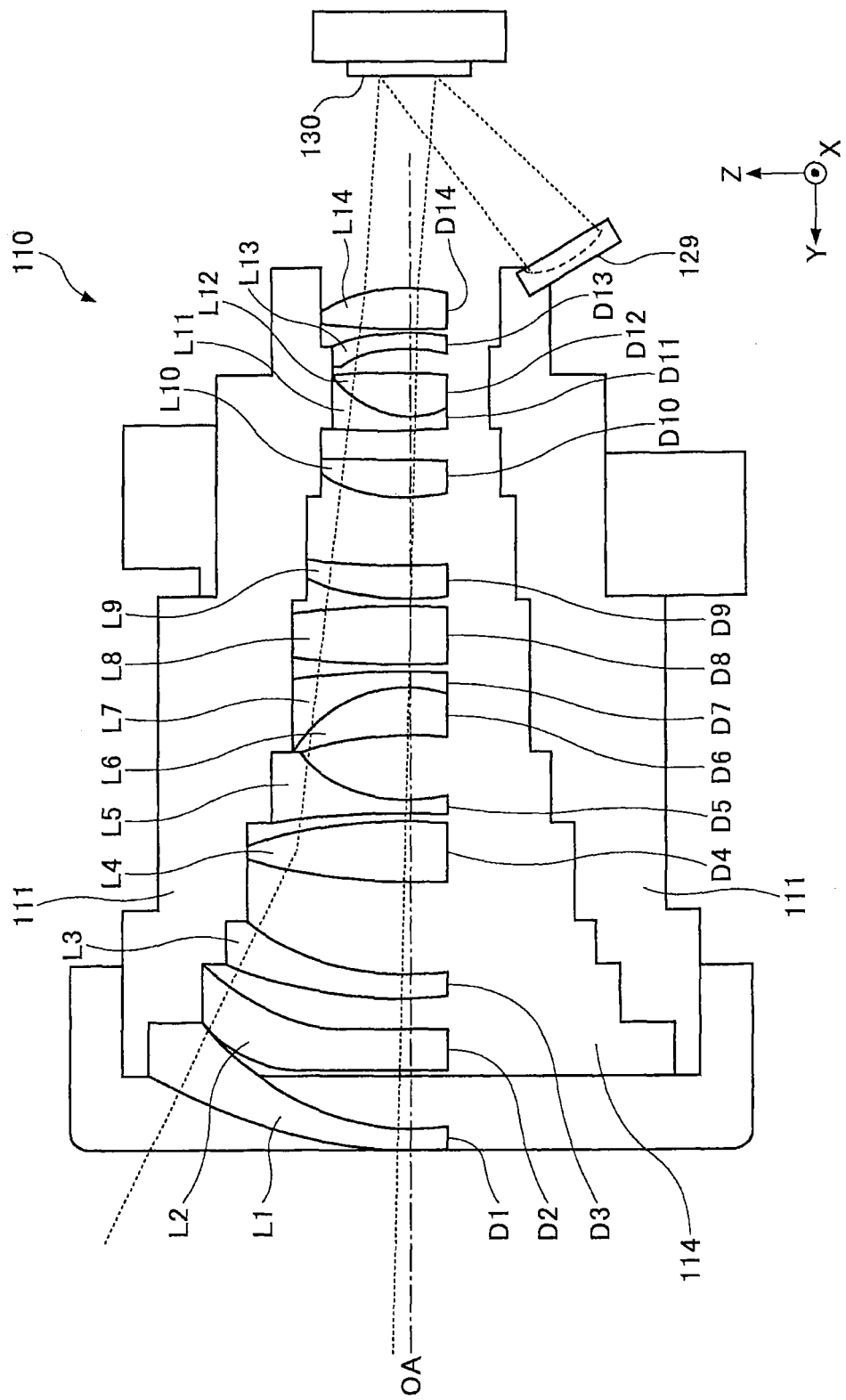
FIG. 6 is a schematic cross-sectional view illustrating an example of the projection optical apparatus in the first embodiment.

FIG. 6 is a schematic YZ cross-sectional view illustrating an example of the configuration of the projection optical system 110 in the first embodiment.

As illustrated in FIG. 6, the projection optical system 110 includes multiple lenses L1 to L14, and a lens holder 111, and is configured to enlarge the display image generated by the DMD 130 from the light reflected off the concave mirror 129.

The outer circumferences of the lenses L1 to L14 form flat surfaces D1 to D14, respectively, such that the flat surfaces D1 to D14 are disposed parallel to one another on a same side of an optical axis OA. Note that in the following description, the lenses L1 to L14 and the flat surfaces D1 to D14 may simply be referred to as the lens(es) L and the flat surface(s) D, respectively.

The lens holder 111 includes a hollow cylinder shape, and is configured to hold the outer circumferences excluding the flat surfaces D of the lenses L. Note that the lens holder 111 may be configured to change gaps between the lenses L in accordance with operations of a zoom lever or the like.

In the projection optical system 110, gaps between the flat surfaces D of the lenses L and an inner circumferential surface of the lens holder 111 are in communication with one another to form a vent hole 114. The heat or the like generated by the light source 120 disposed in the projection optical apparatus 10 is radiated outside the projection optical system 110 via the vent hole 114 so as to suppress the temperature rise in the lenses L or the lens holder 111.

Note that in the projection optical apparatus 10, extraneous light is transmitted in an inclined direction from a light output port of a light tunnel 126. Such extraneous light is not directed toward the DMD 130 but is directed to the lens holder 111 or the like of the projection optical system 110. As a result, the extraneous light may become a factor of the temperature rise of the lens holder 111. However, in the projection optical system 110 according to the embodiment, heat transferred to the lens holder 111 as a result of being heated by the extraneous light is radiated outside via the vent hole 114 so as to suppress the temperature rise of the lens holder 111.

Further, the temperature rise in each of the lenses L may also be suppressed by externally radiating the heat of the lenses L generated by infrared components of the light reflected from the DMD 130 from the vent hole 114.

As described above, the temperature rise in the lenses L and the lens holder 111 may be controlled due to the vent hole 114 formed by the gaps between the flat surfaces D of the lenses L and the inner circumferential surface of the lens holder 111. Hence, the thermal expansion due to the temperature rise in the lenses L and the lens holder 111 may be suppressed, which may reduce the malfunction such as fluctuation in the projection directions or focal positions caused by the displacement of the lenses L.

Note that in the projection optical system 110, the lenses L are disposed such that the flat surfaces of the lenses L are disposed parallel to one another on a same side of the optical axis OA so as to facilitate the flowing of air through the vent hole 114. Alternatively, the lenses L are disposed such that the flat surfaces D of the lenses L are not parallel to one another, and are disposed at different positions in a circumferential direction of the optical axis OA.

Figure 7:
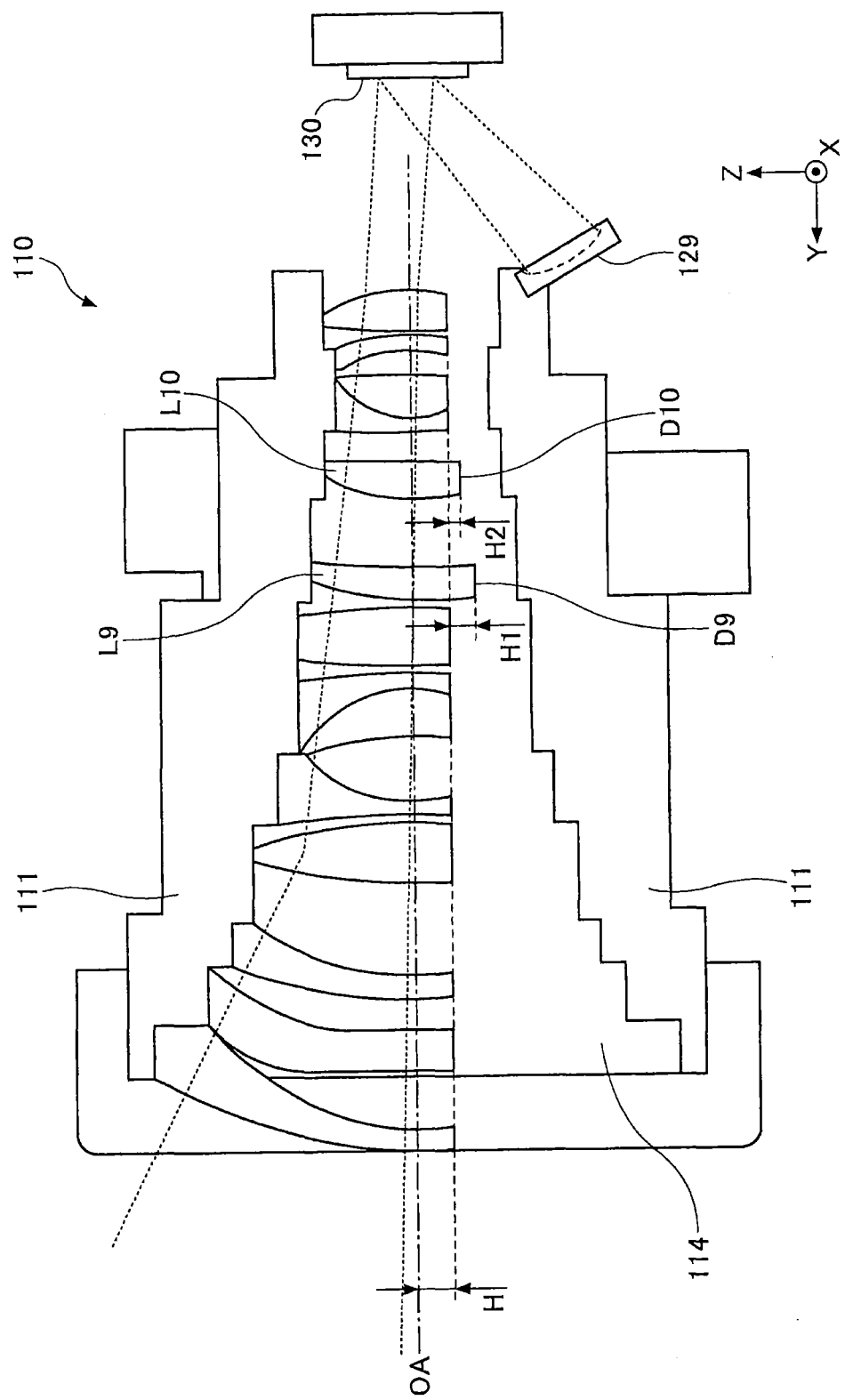
FIG. 7 is a schematic cross-sectional view illustrating an example of the projection optical apparatus in the first embodiment.

In addition, as illustrated in FIG. 7, a distance H between the flat surface D and the optical axis OA in a Z direction is not necessarily constant in all the lenses L. For example, the lenses L more susceptible to being heated and the temperature rise due to being located close to the DMD 130 or the light source 120 may be disposed at positions projecting toward the vent hole 114 side compared to the other lenses L so as to increase the distance H between the flat surface D of each of the lenses L and the optical axis OA in the Z direction.

In the configuration example illustrated in FIG. 7, the lenses L are disposed such that a distance H1 between a flat surface D9 of the lens L9 and the optical axis OA, and a distance H2 between a flat surface D10 of the lens L10 and the optical axis OA in the Z direction are greater than the distance H between the flat surfaces D of the other lenses L and the optical axis OA. Hence, the lenses L9 and L10 projecting toward the vent hole 14 side may radiate heat easily in the vent hole 114 to suppress the temperature rise of the lenses L9 and L10.

Accordingly, the lenses L sensitive to heat or the lenses L disposed close to the positions susceptible to the temperature rise are disposed such that the lenses L project into the vent hole 114, and the flat surfaces D of the lenses L are located at different levels, which may suppress the thermal expansion of the lenses L.

As described above, in the projection optical apparatus 10 according to the first embodiment, the temperature rise of the lenses L or the lens holder 111 in the projection optical system 110 may be suppressed as a result of a heat radiation effect in the vent hole 114. Hence, in the projection optical apparatus 10, the fluctuation in the projection directions or the focal positions resulting from the thermal expansion of the lenses L or the lens holder 111 may be lowered. Accordingly, in the image projection apparatus 1 having the projection optical apparatus 10, the quality of the display image may be maintained by lowering the fluctuation in the projection directions or the focal positions in the projection optical system 10.

Second Embodiment

Next, a description is given of a configuration of an image projection apparatus 1 in a second embodiment with reference to the accompanying drawings. Note that an illustration of components identical to those described above may be omitted from the description.

Figure 8:
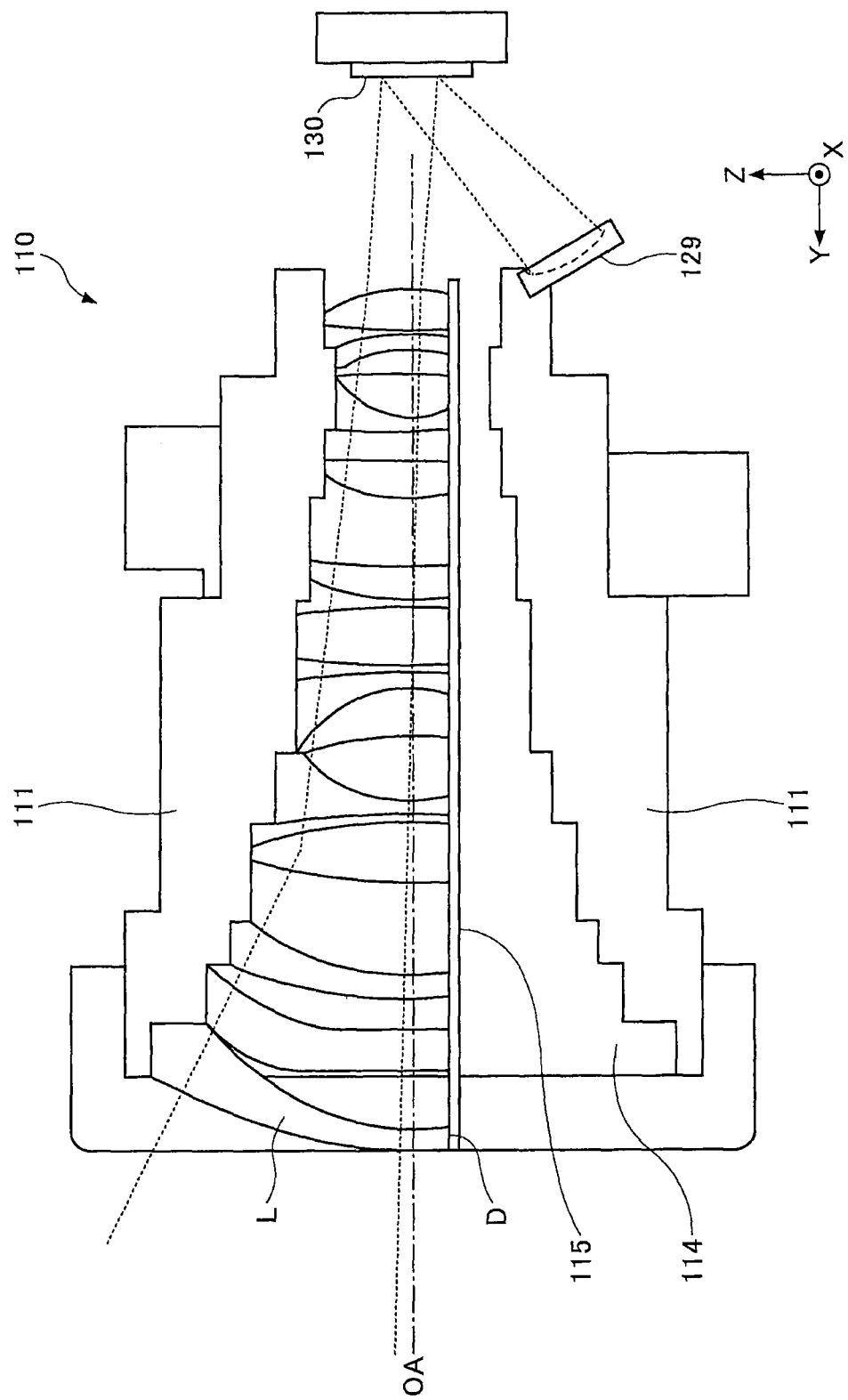
FIG. 8 is a schematic cross-sectional view illustrating an example of a projection optical apparatus in a second embodiment.

FIG. 8 is a schematic YZ cross-sectional view illustrating an example of a configuration of a projection optical system 110 in the second embodiment. As illustrated in FIG. 8, the projection optical system 110 in the second embodiment includes a radiator plate 115.

The radiator plate 115 is a plate member composed of a metallic material such as aluminum or copper exhibiting high thermal conductivity, and is disposed such that the radiator plate 115 is in contact with at least one flat surface D of each of the lenses L disposed in the projection optical system 110. Note that the radiator plate 115 may have multiple ribs extending in an X or Y direction on the vent hole 114 side face so as to enlarge the surface area of the radiator plate 115 and improve the heat radiation effect.

In the above-described configuration, the heat generated in the lenses L resulting from the infrared components of the light reflected from the DMD 130 is radiated in the vent hole 114 via the radiator plate 115 to further suppress the temperature rise of the lenses L.

Figure 9:
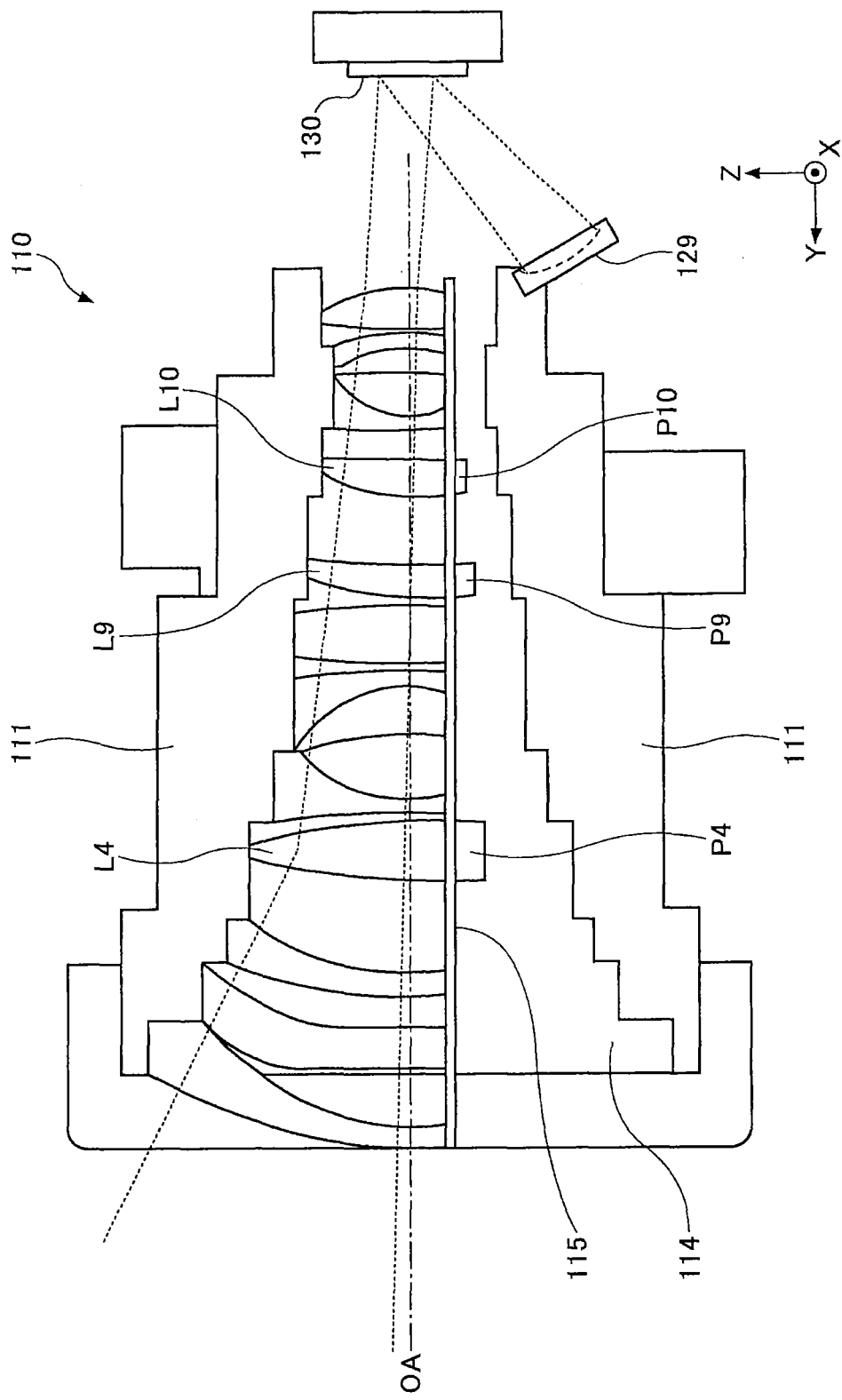
FIG. 9 is a schematic cross-sectional view illustrating an example of the projection optical apparatus in the second embodiment.

Moreover, as illustrated in FIG. 9, the lenses L sensitive to heat or the lenses L disposed close to the positions susceptible to the temperature rise may be provided with projections P that project from the radiator plate 115 into the vent hole 114.

In the configuration example of FIG. 9, the lenses L4, L9, and 10 are provided with the respective projections P4, P9, and P10 that project from the radiator plate 115 into the vent hole 114. Hence, the lenses L4, L9, and 10 having the respective projections P4, P9, and P10 may be able to radiate heat via the radiator plate 115 simultaneously with obtaining a cooling effect owing to the flowing of air inside the vent hole 114, thereby further lowering the temperature rise.

As described above, in the projection optical apparatus 10 according to the second embodiment, the temperature rise of the lenses L or the lens holder 111 in the projection optical system 110 may be suppressed as a result of the heat radiation effect in the vent hole 114 and the radiator plate 115. Accordingly, in the projection optical apparatus 10, the fluctuation in the projection directions or the focal positions resulting from the thermal expansion of the lenses L or the lens holder 111 may be lowered, and the quality of the display image projected by the image projection apparatus 1 may be maintained.

Third Embodiment

Next, a description is given of a configuration of an image projection apparatus 1 in a third embodiment with reference to the accompanying drawings. Note that components identical to those described above may be omitted from the description.

Figure 10:
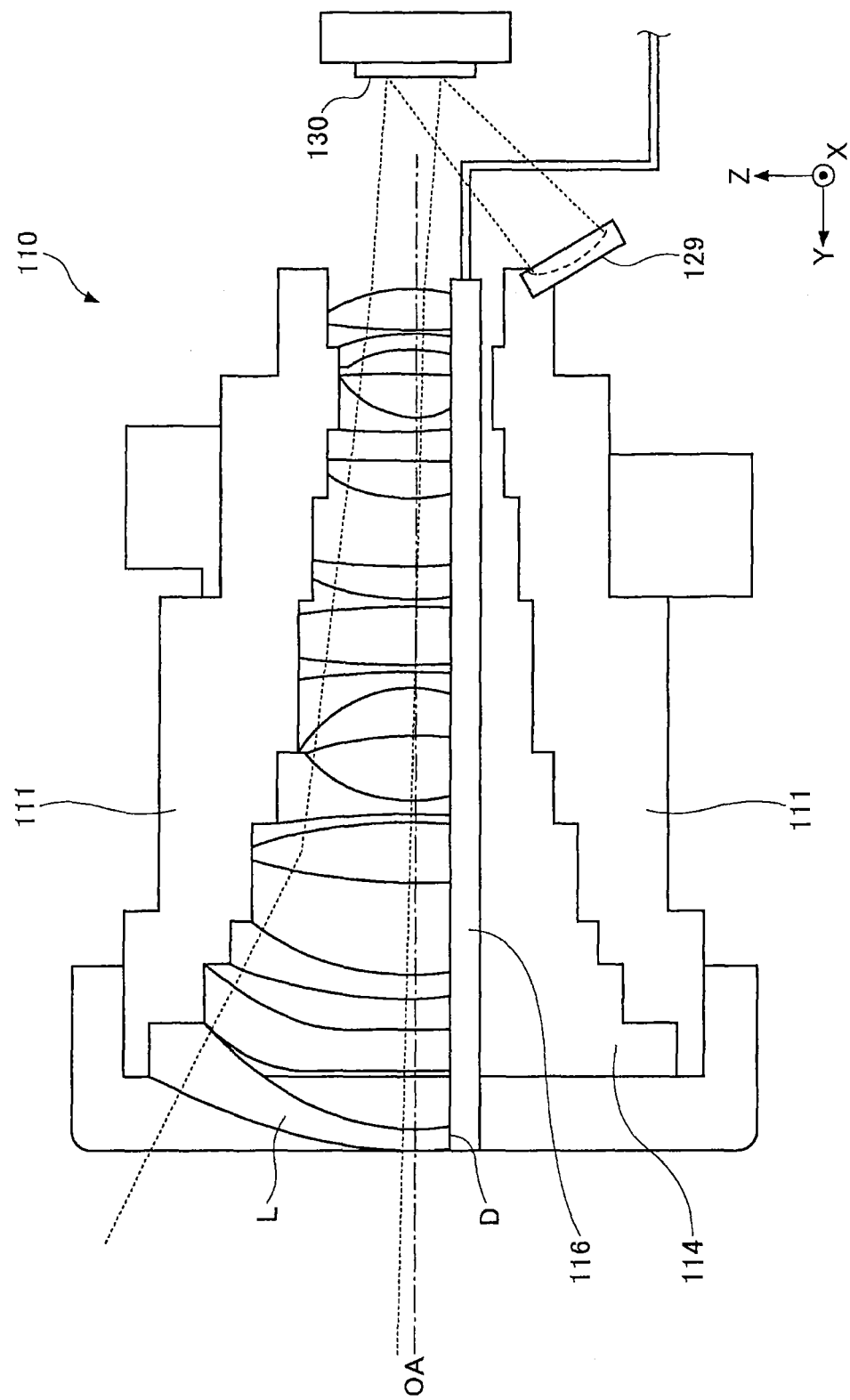
FIG. 10 is a schematic cross-sectional view illustrating an example of a projection optical apparatus in a third embodiment.

FIG. 10 is a schematic YZ cross-sectional view illustrating an example of a configuration of a projection optical system 110 in the third embodiment. As illustrated in FIG. 10, the projection optical system 110 in the third embodiment includes a heat pipe 116.

The heat pipe 116 is disposed such that the heat pipe 116 is in contact with at least one flat surface D of each of the lenses L disposed in the projection optical system 110. The lenses L are cooled by the heat pipe 116, which suppresses the temperature rise of the lenses L resulting from the infrared components of the light reflected from the DMD 130.

Note that the heat pipe 116 may be disposed in the projection optical system 110 together with the radiator plate 115 exemplified in the second embodiment. In this case, the heat pipe 116 is disposed, for example, on the vent hole 114 side face of the radiator plate 115 that is in contact with the flat surfaces D of the lenses L via the radiator plate 115, so that the heat pipe 116 is in contact with the flat surfaces D of the lenses L via the radiator plate 115.

Further, a heat transfer sheet composed of an elastically deformable and highly thermally conductive material may be disposed between the radiator plate 115 and the heat pipe 116. The radiator plate 115 and the heat pipe 116 are tightly attached via a heat transfer sheet, thereby improving the cooling effect by the heat pipe 116. Further, the heat pipe 116 may be disposed such that the heat pipe 116 is in contact with the projections P of the lenses L projecting from the radiator 115 into the vent hole 114.

Thus, the projection optical system 110 is provided with the radiator plate 115 and the heat pipe 116 to enable the projection optical system 110 to simultaneously obtain the radiating effect obtained by the radiator plate 115, and the cooling effect obtained by heat pipe 116, which may further suppresses the temperature rise of the lenses L.

As described above, in the projection optical apparatus 10 according to the third embodiment, the temperature rise of the lenses L or the lens holder 111 in the projection optical system 110 may be suppressed as a result of the cooling effect obtained by the heat pipe 116 in addition to the heat radiation effect obtained by the vent hole 114. Accordingly, in the projection optical apparatus 10, the fluctuation in the projection directions or the focal positions resulting from the thermal expansion of the lenses L or the lens holder 111 may be lowered, and the quality of the display image projected by the image projection apparatus 1 may be maintained.

Fourth Embodiment

Next, a description is given of a configuration of an image projection apparatus 1 in a fourth embodiment with reference to the accompanying drawings. Note that components identical to those described above may be omitted from the description.

Figure 11:
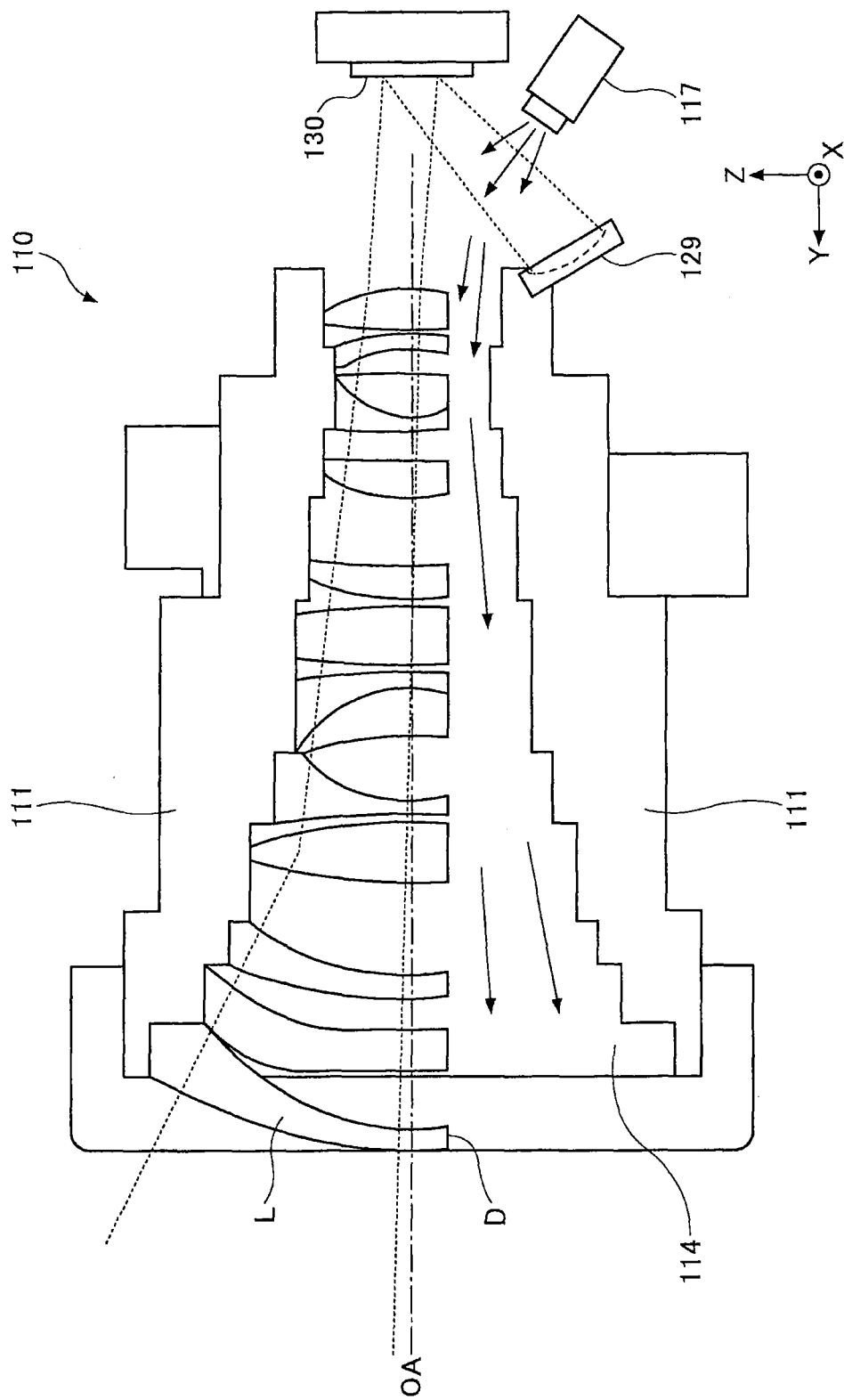
FIG. 11 is a schematic cross-sectional view illustrating an example of a projection optical apparatus in a fourth embodiment.

FIG. 11 is a schematic YZ cross-sectional view illustrating an example of a configuration of a projection optical system 110 in the fourth embodiment. As illustrated in FIG. 11, the projection optical system 110 in the fourth embodiment is provided with a fan 117 serving as a blower configured to blow air into the vent hole 114.

The fan 117 is configured to blow air into the vent hole 114 to transfer heat generated from the light source 120 via the vent hole 114 in the projection optical apparatus 10 to the outside simultaneously with cooling the lenses L and the lens holder 111 of the projection optical system 110. As described above, in the projection optical system 110 in the fourth embodiment, the fan cools the lenses L or the lens holder 111 to suppress the temperature rise of the lenses L or the lens holder 111.

Note that in the projection optical system 110 according to the fourth embodiment, the lenses L sensitive to heat or the lenses L susceptible to the temperature rise may be disposed such that the flat surfaces D of the lenses L project into the vent hole 114, and the flat surfaces D of the lenses L are disposed at different levels. In the above-described configuration, the lenses L projected into or toward the vent hole 114 side may be easily cooled by receiving the air blowing from the fan 117.

Moreover, the fan 117 may be disposed together with at least one of the radiator plate 115 and the heat pipe 116 exemplified in the above-described embodiments. As a result, in the projection optical system 110 according to the fourth embodiment, a cooling effect may be obtained by the fan 117 in addition to the radiation effect obtained by the radiator plate 115 or the cooling effect obtained by the heat pipe 116 to further suppress the temperature rise of the lenses L or the lens holder 111.

Figure 12:
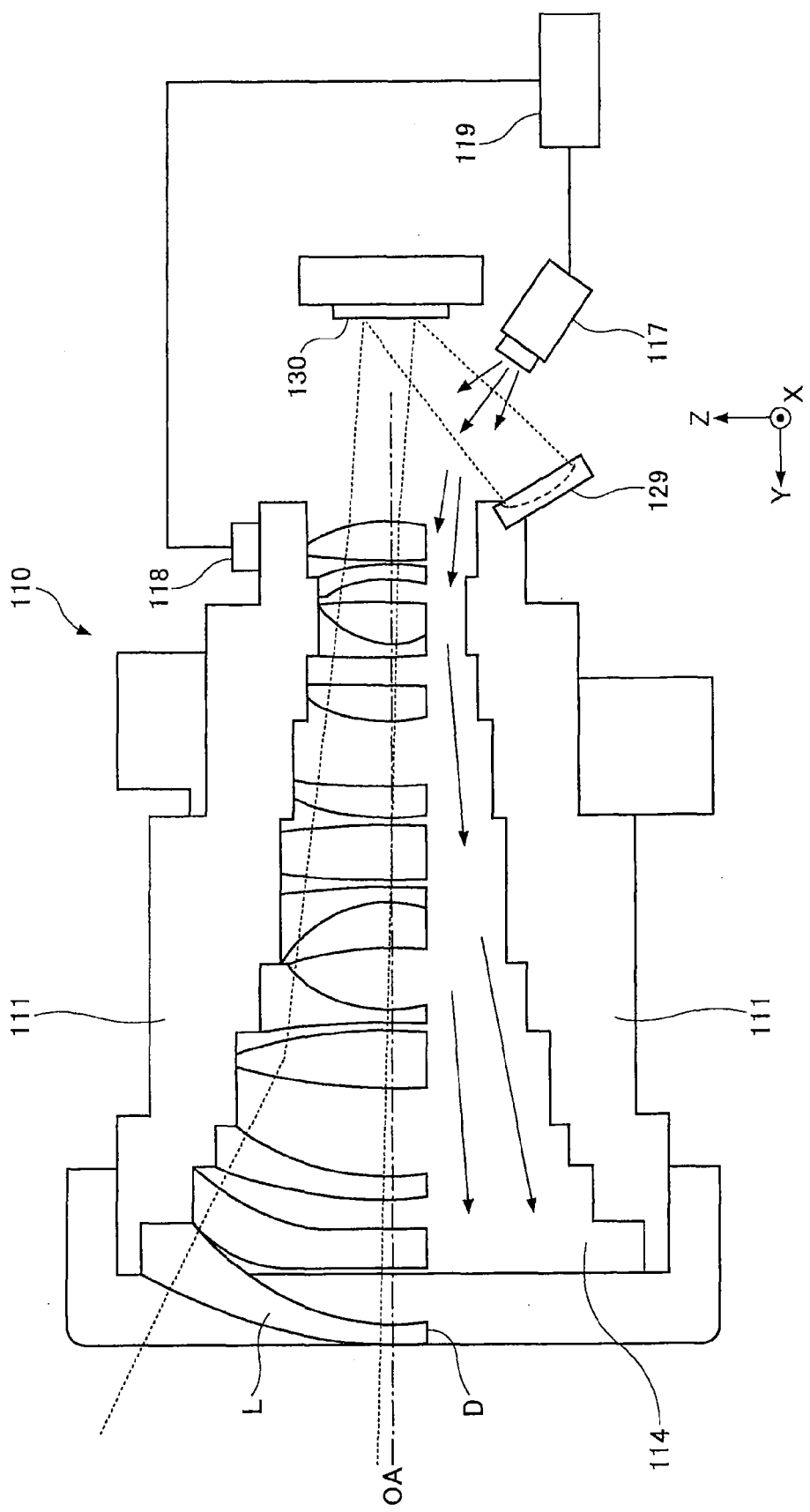
FIG. 12 is a schematic cross-sectional view illustrating an example of the projection optical apparatus in the fourth embodiment.

Further, as illustrated in FIG. 12, the projection optical system 110 according to the fourth embodiment may be configured such that a controller 119 controls air volume of the fan 117 based on a detected result of the temperature obtained by a temperature detector 118 attached to the projection optical system 110.

The temperature detector 118 may, for example, be a thermocouple or the like that is attached to the outer circumference of the lens holder 111. Note that the temperature detector 118 may be provided at a position differing from the position in the fourth embodiment, and multiple temperature detectors may be disposed at different positions.

The controller 119 may include a CPU, a ROM, a RAM, and the like, and may be configured to execute a program stored in the ROM in collaboration with the CPU and the RAM so as to control the air volume of the fan 117 based on the detected result of temperature obtained by the temperature detector 118.

Figure 13:
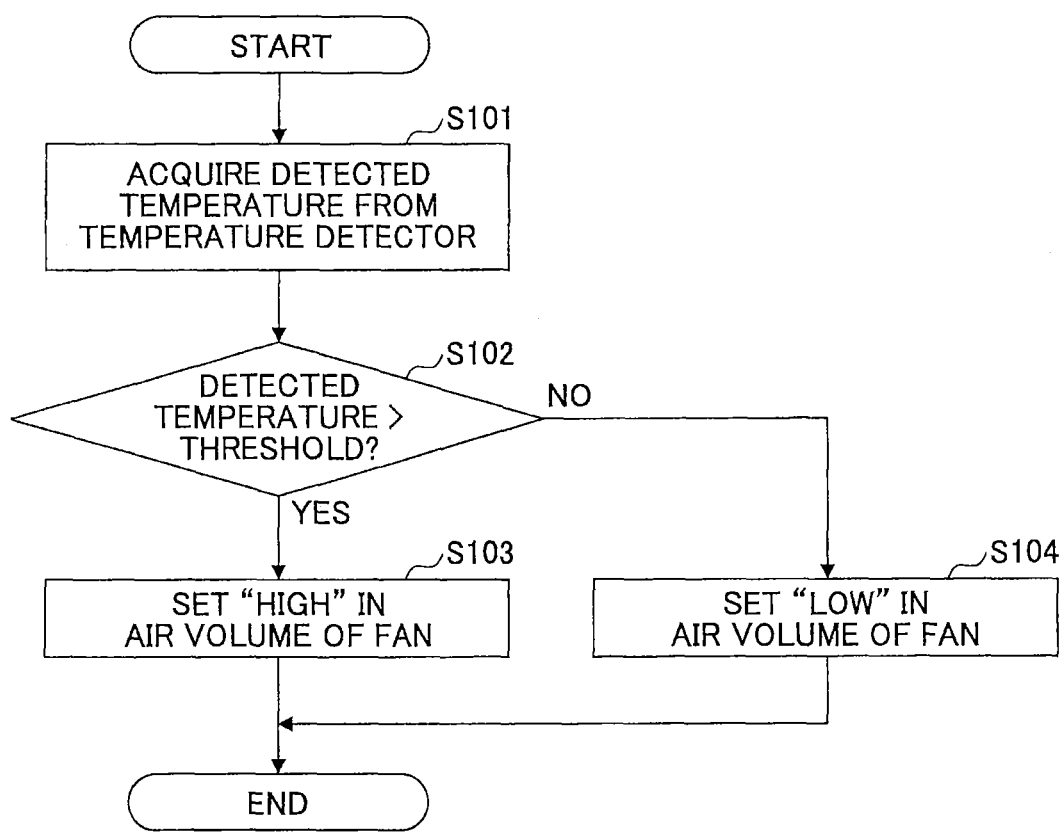
FIG. 13 is a flowchart illustrating an example of an air volume control process in the fourth embodiment.

FIG. 13 is a flowchart illustrating an example of an air volume control process in the fourth embodiment.

As illustrated in FIG. 13, in step S101, the controller 119 acquires a detected temperature from the temperature detector 118. Subsequently, in step S102, the controller 119 compares the acquired detected temperature and a threshold set in advance.

When the detected temperature is higher than the threshold, the controller 119 raises the number of rotations of the fan 117 to set "high" in the air volume of the fan 117 in step 5103. The cooling effect on the lenses L or the lens holder 111 in the projection optical system 110 may be improved by increase in the air volume blowing from the fan 117.

Further, when the detected temperature is lower than the threshold, the controller 119 reduces the number of rotations of the fan 117 to set "low" in the air volume of the fan 117 in step S104. As described above, when the temperature of the lenses L or the lens holder 111 is not raised, the controller 119 may decrease the number of rotations of the fan 117 so as to reduce noise of the fan 117 as well as lower the power consumption.

Note that the controller 119 may control the air volume of the fan 117 in a multiple stepwise fashion based on the threshold set in advance. Thus, the controller 119 may be able to appropriately control the air volume of the fan 117 based on the temperature of the lenses L or the lens holder 111 in the projection optical system 110 so as to cool the lenses L or the lens holder 111 without wasting the electric power.

As described above, in the projection optical apparatus 10 according to the fourth embodiment, the temperature rise of the lenses L or the lens holder 111 in the projection optical system 110 may be suppressed by causing the fan 117 to blow air into the vent hole 114 to cool the lenses L or the lens holder 111 in the projection optical system 110. Accordingly, in the projection optical apparatus 10, the fluctuation in the projection directions or the focal positions resulting from the thermal expansion of the lenses L or the lens holder 111 may be lowered, and the quality of the display image projected by the image projection apparatus 1 may be maintained.

The projection optical apparatus and the image projection apparatus according to the embodiments are described above; however, the present invention is not limited to these embodiments described above. Various alteration and modification may be made within the scope of the claims. For example, the configuration of the lenses L or the shape of the lens holder 111 may differ from those described above in the respective embodiments.

According to the embodiments, there is provided the projection optical apparatus capable of controlling the temperature rise in the optical system.

The present invention is not limited to the specifically disclosed embodiments, and variations and modifications may be made without departing from the scope of the present invention.

The present application is based on and claims the benefit of priprity of Japanese Priority Application No. 2014-177453 filed on Sep. 1, 2014, the entire contents of which are hereby incorporated herein by reference.

What is claimed is:

1. A projection optical apparatus comprising:
    a plurality of lenses, each of the lenses having a flat surface in a part of an outer circumference;
    a lens holder having a hollow cylindrical shape and configured to hold the lenses; and
    a vent hole formed of gaps communicating between the flat surfaces of the lenses and the lens holder.

2. The projection optical apparatus as claimed in claim 1, wherein the lenses are disposed such that the flat surfaces of the lenses are disposed parallel to one another on a same side of an optical axis.

3. The projection optical apparatus as claimed in claim 2, wherein the lenses are disposed such that the flat surfaces of the lenses are positioned at different levels.

4. The projection optical apparatus as claimed in claim 1, further comprising:
    a radiator plate configured to be in contact with at least one of the flat surfaces of the lenses to radiate heat.

5. The projection optical apparatus as claimed in claim 4, wherein at least one of the lenses includes a projection projecting from the radiator plate toward the vent hole.

6. The projection optical apparatus as claimed in claim 1, further comprising:
    a heat pipe configured to be in contact with at least one of the flat surfaces of the lenses to cool.

7. The projection optical apparatus as claimed in claim 1, further comprising:
    a blower configured to blow air into the vent hole.

8. The projection optical apparatus as claimed in claim 7, further comprising:
    a temperature detector attached to the lens holder; and
    a controller configured to control an air volume of the blower based on a detected result of a temperature obtained by the temperature detector.

9. An image projection apparatus comprising the projection optical apparatus as claimed in claim 1.

10. The image projection apparatus as claimed in claim 9, further comprising:
    a digital mirror device configured to modulate light emitted from a light source based on a projected display image to transmit the modulated light into the lenses.

* * * * *